April 27, 1937.  W. A. CARTER  2,078,837
MECHANISM FOR UTILIZING THE ENERGY OF A CURRENT OF FLUID
Filed June 27, 1935　　2 Sheets-Sheet 2
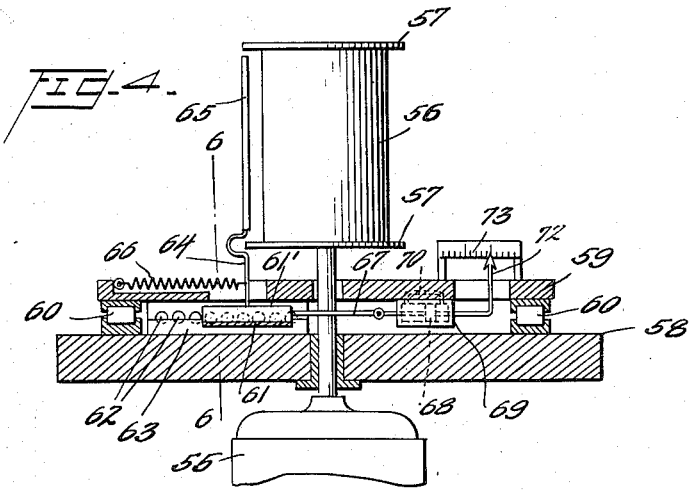
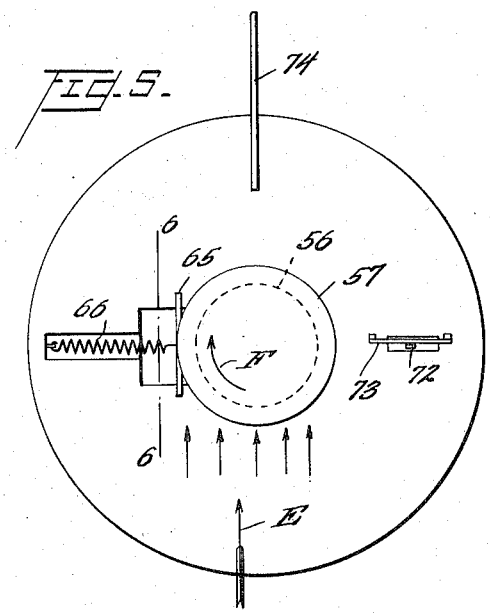
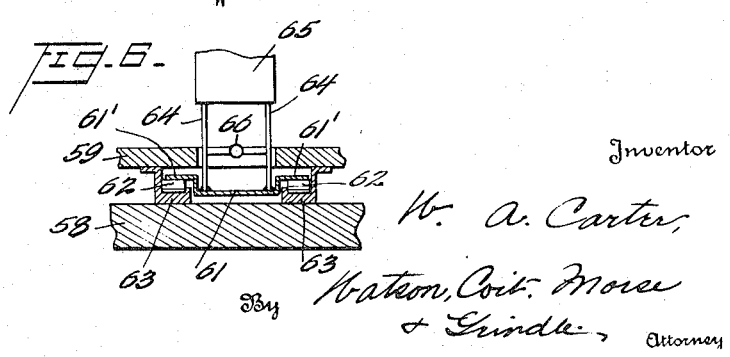

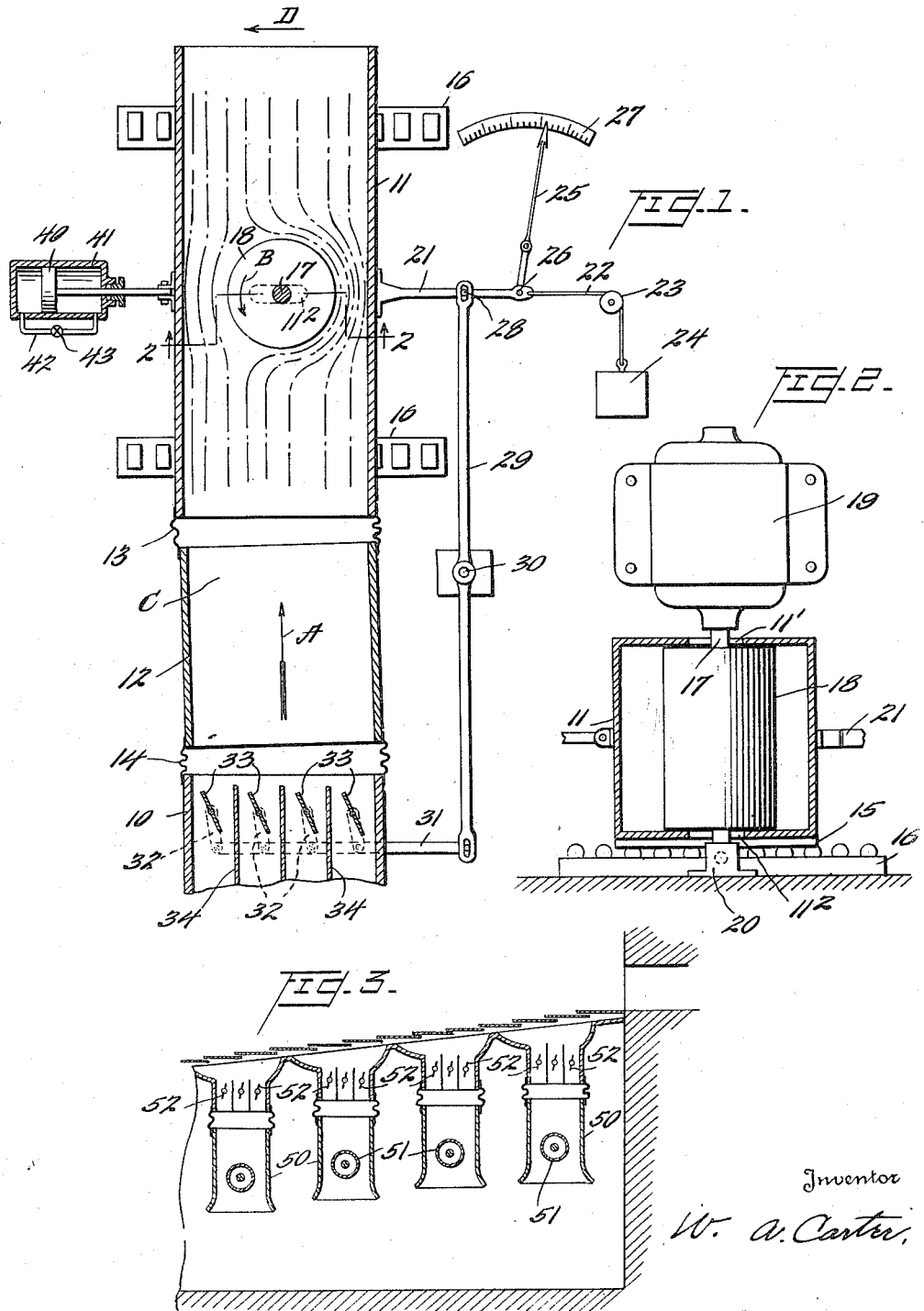

UNITED STATES PATENT OFFICE 2,078,837

MECHANISM FOR UTILIZING THE ENERGY OF A CURRENT OF FLUID

Wilber A. Carter, Detroit, Mich.

Application June 27, 1935, Serial No. 28,733

9 Claims. (Cl. 170—159)

The present invention relates to mechanism for utilizing the energy of a current of fluid and relates particularly to a mechanism of this general character employing as one of its elements a rotatable member having a shape suitable for the production of the Magnus pressure.

It has heretofore been suggested that the so-called Magnus effect may be economically utilized in various ways, for instance in the propulsion of ships and in the development of power upon land. By rotating an element which is generally cylindrical or at least has the surface of a figure of revolution, about its axis, and subjecting the same while so rotating to the action of a fluid current, generally an unconfined current of air, an increased pressure is built up upon one side of the element and a lowered pressure caused to occur on the opposite side, the rotating member being drawn or forced transversely of the direction of flow of the fluid current by the unbalanced pressure so developed.

It has generally been considered necessary heretofore to so mount the rotatable element, which will be hereinafter generally designated a cylinder, although it may not be truly cylindrical, in such manner that its axis of rotation may move laterally. Heretofore also it has been generally thought that the Magnus effect may be realized only to a substantial degree when the fluid current passing over the rotating cylinder is laterally unconfined in order that the development of high and low pressure zones on opposite sides of the cylinder may not be injuriously affected by the proximity of bodies which might interfere with the free flow of air currents.

The present invention contemplates a mechanism for utilizing the energy of flow of a fluid current in a novel manner, the mechanism including in addition to the rotatable cylinder or element, means for laterally confining the fluid flow in proximity to such element, the means and element being mounted for relative movement and such relative movements occurring from time to time as the magnitude of the Magnus pressure on the side of the rotating cylinder is increased or decreased. In other words the force developed by the rotation of the cylinder in the fluid current is not expended in merely moving the cylinder laterally through the air current, but is utilized in effecting relative bodily movement of the cylinder and some member positioned closely adjacent the same, the arrangement being such that relative movement of these parts in one direction is brought about by an increase in the Magnus pressure and relative movement in the opposite direction brought about by decrease in such pressure. In the preferred case the cylinder is mounted for rotation about a fixed axis and the member is mounted so as to be bodily movable toward and away from the rotating cylinder. It will, of course, be understood that the cylinder itself will be bodily movable to a limited extent relative to the adjacent member, or that both cylinder and member may be bodily movable in accordance with the variations in Magnus pressure.

Means is connected either to the cylinder support, or to the member positioned adjacent the cylinder, or to both cylinder and member, for utilizing the effort developed to produce such relative movements. While in the average case no great amount of power may be taken from the mechanism for the performance of useful work, yet it is possible to take therefrom sufficient power for the operation of indicators, relays, servo mechanisms, etc., including control valves of the more easily operated type. In certain instances, it is desirable to employ the novel mechanism as a regulating or controlling means, other mechanisms being regulated or controlled in accordance with the variations of Magnus pressure developed, particularly where the fluid current is passing through a conduit in which a rotating cylinder is located, and is under fan, blower, or pump pressure. Thus by providing valves for regulating the flow of fluid through the conduit and also providing a valve operating means which is called into operation upon the occurrence of relative movement between the cylinder and the walls of the conduit, it is quite possible to effect constant automatic control of the flow of fluid through the conduit, increase in Magnus pressure due to increase in velocity of flow of fluid effecting closing movements of the valve or valves, and decrease in Magnus pressure due to the falling off of fluid flow velocity causing opening movements of the valves. By such an arrangement therefore a substantially uniform flow of fluid through a conduit may be maintained despite variations in the action of the fluid propelling means and hence a mechanism of this type is highly useful when employed to control or regulate the flow of combustion supporting air to the firebox or grate of a furnace in which it is desired to maintain a uniform rate of combustion.

The invention is not limited, however, to mechanisms in which the flowing fluid is constrained to move through closed conduits, but may likewise be employed usefully in the open and where winds may blow at various velocities from all directions.

Different embodiments of the invention may be designed and constructed to fill various fields of usefulness in the mechanical arts, and several are illustrated on the accompanying drawings and will be hereinafter described in detail, these embodiments being by way of example only.

In the drawings:

Figure 1 is a diagrammatic representation of one embodiment of the invention in which the rotating cylinder is located in a conduit and means is provided for regulating the flow of fluid through the conduit in accordance with variations in the Magnus pressure developed in order that the resultant flow may be maintained uniform;

Figure 2 is a section on line 2—2 of Figure 1;

Figure 3 is a diagrammatic view of a portion of the firebox of a boiler, showing a plurality of air supply tubes and means for regulating the flow of air through these tubes and to the fuel superposed upon the grate;

Figure 4 is a rather diagrammatic section through an embodiment of the invention intended for use in the open air;

Figure 5 is a top plan view of the same; and

Figure 6 is a section on line 6—6 of Figure 4.

Referring first to the form of the invention shown in Figures 1 and 2. A conduit for air or other fluid is generally indicated at C. This conduit includes the stationary section 10, the laterally shiftable section 11 and the intermediate rockable section 12, the ends of which have flexible but fluid tight connections with the adjacent ends of the sections 10 and 11 through the instrumentality of the light flexible and extensible tubular sections 13 and 14 respectively. The tube C may be disposed vertically or horizontally or in any desired direction, but in Figures 1 and 2 the axis of the tube is horizontally disposed, the shiftable section 11 being supported upon anti-friction bearings for practically frictionless lateral movement, the upper races 15 of the bearings being secured to the bottom of tube 11 and the lower races 16 being mounted upon any suitable base or support. Midway of the length of section 11 its bottom and top are transversely slotted as indicated at 11' and 11², and projecting through these aligned slots is a shaft 17 upon which is fixed the cylinder 18. The upper end of shaft 17 is connected to a propelling means, preferably being directly connected to the rotor of a fixed electric motor 19. The bottom of the shaft is supported upon any suitable type of step bearing 20. By means of motor 19 the cylinder may be rotated at any desired or selected angular velocity, suitable electrically controlled means being provided to render the motor speed variable at the will of the operator.

Projecting from one side of the fluid conduit is an arm 21 and to the end of this arm is connected a flexible element 22 which passes over a pulley 23 and has attached to its lower end a relatively light weight 24. The lower end of a pointer 25 is pivotally connected to the arm 21 at 26, the upper end of the indicator 25 being adapted to play over a graduated segment 27. Also connected to arm 21 by means of a pin 28 is one end of a rocking lever 29, adapted to rock about a fixed pivot 30. The opposite end of this lever 29 is connected by means of a link 31 to a plurality of arms 32 connected respectively to a series of butterfly valves 33 mounted to rotate about parallel axes and positioned within the stationary section 10 of the fluid conduit. The several butterfly valves 33 may be positioned respectively in separate fluid channels, a vertically extending division plate 34 being positioned between each pair of adjacent valves.

Also connected centrally to the section 11 of the fluid conduit is a piston 40 adapted to slide within a cylinder 41, the cylinder being filled with any suitable fluid and having a by-pass 42 from one end to the other, which by-pass is controlled by a valve 43. The piston, cylinder and by-pass just described taken together comprise a damping device which, while not preventing movement of the section 11 of the conduit from side to side dampens minor oscillations of the conduit incident to sudden changes of Magnus pressure within the same.

It will be understood that means (not illustrated) such as a fan, blower, pump or the like is provided for forcing through the conduit C, and in the direction of the arrow A, a stream of fluid. The nature of the fluid may vary considerably provided that it is not unduly viscous, but the present mechanism is, as are all mechanisms of this general character, primarily intended for use in connection with gases, particularly air. The flowing stream of fluid upon meeting the rapidly rotating cylinder 18 will be so acted upon by the cylinder, which is rotated in the direction of the arrow B, that the great bulk of the air which meets its convex surface is directed to the right hand side of the cylinder, as viewed in Figure 1, causing larger volumes of air to pass the cylinder on the right than on the left, hence increasing greatly the velocity of the air flowing to the right of the cylinder and decreasing the static pressure which exists in the conduit between the cylinder and the right hand wall of section 11 of the conduit. A reduced pressure is caused to occur in this zone as a result of this action. To the left of the cylinder the static pressure is greater than on the right owing to the Magnus effect.

As the cylinder 18 is rotating about a fixed vertical axis, and as there exists a pressure differential across the cylinder, the pressure on the right being the smaller, a force will be exerted upon each of the side walls of tube section 11 tending to move the same in the direction of the arrow D and this relative movement of tube and cylinder will occur if the force developed is sufficiently great to overcome the counterforce of the weight 24. If movement does occur, it is communicated through the connecting linkage to the butterfly valves 33 which tend to close and decrease the volume of air flowing through the conduit. As a result of this decrease in air flow, the Magnus pressure in the vicinity of the cylinder is decreased, the tube section 11 again tends to move to the right, and eventually a point of equilibrium is reached for any predetermined flow of fluid through the conduit, the butterfly valves 33 assuming a fixed position. So long as this volume of flow is maintained, the Magnus pressure remains the same and the valves remain stationary. Any substantial variation in flow, however, resulting from change in the operation of the blower, pump or other fluid impeller, affects the automatic regulation of the butterfly valves so that the volumes of fluid which actually pass through the tube at equal intervals of time remain substantially constant.

As is well known, the Magnus pressure varies not only with the velocity of the flow of fluid passing over the cylinder but also with variations in angular velocity of the cylinder. Hence, it is possible by regulating the speed of the motor 19 to increase or decrease, as desired, the Magnus pressure within the conduit and without varying the speed of operation of the blower or pump. The operator is therefore enabled by varying his motor speed in making initial adjustments to bring about the desired Magnus pressure within the conduit to effect a satisfactory operation of the device.

In Figure 3 a plurality of individually formed and supported fluid conduits are shown to be positioned vertically, in parallelism, immediately below the grate bars of a firebox designed and constructed for the consumption of coal. All of the operating elements are not disclosed, but it will be appreciated that the tube sections 50 may swing laterally with respect to the cylinders 51 and that the lateral movements of these tube sections 50 effect variations in the positions of the butterfly valves 52, just as in the case of the mechanism shown in Figures 1 and 2. Regulated flow of air into the combustion space is therefore realized despite variations in pressure or flow of the air delivered by the blower or pump, and despite variations in fuel bed resistance.

In the form of the invention shown in Figures 4-6 a motor 55 is rigidly supported by means not shown, the shaft of this motor being vertically disposed and having mounted upon an extension thereof the cylinder 56. Cylinder 56 is provided with top and bottom plates or discs 57 to prevent flow of air from the high pressure side to the low pressure side. A supporting frame member, horizontally disposed, is indicated at 58 and rotatably mounted upon frame member 58 is a disc like platform member 59, ball or roller bearings 60 being interposed between support 58 and platform 59 to enable platform 59 to rotate about a central axis in a practically frictionless manner upon its support.

Suspended from platform 59 in such manner as to be radially movable relative thereto is a block 61, this block having flanges 61' which rest upon rollers 62 supported by roller tracks 63 hung from the platform. Fixed upon the upper ends of vertical legs 64, the lower ends of which legs are rigidly secured to block 61, is a flat plate 65, disposed in a vertical plane and positioned in close proximity to the cylinder 56. A spring 66 normally tends to draw the block 61 and plate 65 away from cylinder 56. To block 61 is also connected by means of rods 67, a piston 68 slidable in cylinder 69 having a valve controlled by-pass 70; cylinder 69 is filled with a fluid, and the effect of the parts just described is to damp out rapid oscillations of plate 65 in the operation of the device. To piston 68 is also connected an indicating arm or pointer 72 adapted to play over a divided scale 73 and hence to indicate thereon the various positions of the movable plate 65 with respect to the remainder of the apparatus.

In the operation of the device it is intended that the plate 65 shall at all times be edgewise to the flow of air currents, the direction of such flow being indicated by the arrow E, and for the purpose of maintaining the plate in such position the rotatable platform 59 is provided with a wind vane 74. The cylinder 56 is rotated in the direction of the arrow F and hence, remembering that the wind is moving in the direction of the arrow E, it will be apparent that the pressure intermediate the plate 65 and cylinder 56 will be reduced, and, the pressure to the left of plate 65 remaining the same, it naturally follows that this plate will have a tendency to move to the right (Figures 4 and 5) and to extend the spring 66. The magnitude of movement of plate 65 will depend upon the degree of reduced pressure produced between this member and the adjacent wall of cylinder 56, the less the air pressure between these members the greater the movement. The extent of movement can at all times be observed by reading the position of the pointer 72 on the scale 73. As the pressure between plate 65 and cylinder 56 increases, due to the falling off in velocity of the wind, plate 65 will move to the left, as will be apparent.

An appliance such as that just described may be freely exposed and may be utilized as means for detecting wind velocities. While no great amount of power can be taken from it without seriously affecting its accuracy, it is nevertheless clear that by making use of mechanical or electrical relays, servo mechanisms and the like, other instrumentalities may be operated, regulated or controlled in accordance with wind velocities and hence the mechanism may be made use of to perform various functions throughout the mechanical arts.

The several embodiments of the invention illustrated and just described are set forth by way of example only as will be clear to one skilled in the art and many others may be devised in adapting the invention to various specific problems.

Having thus described the invention, what is claimed as new and desired to be secured by Letters Patent is:

1. Mechanism of the type described comprising, in combination, a member having a shape suitable to produce the Magnus effect, a second member movably supported adjacent said first member and so positioned relatively to said first member as to be moved relatively to said first member by variations in fluid pressure brought about by operation of said first member, and means to operate said first member and to cause the same to produce the Magnus effect.

2. Mechanism of the type described comprising, in combination, two relatively movable members, one of which has a shape suitable to produce the Magnus effect, means for operating said last mentioned member to produce the Magnus effect, and means actuated upon the occurrence of relative movement between said members.

3. Mechanism of the class described comprising, in combination, two relatively movable members adapted to approach each other when the pressure existing in a fluid medium therebetween is lowered and to recede from each other when the fluid pressure therebetween is increased, one of said members having a shape suitable to produce the Magnus effect, and means for operating said last mentioned member to cause the same to produce the Magnus effect and to thereby effect relative movement of said members when subjected to a flowing fluid.

4. Mechanism of the class described comprising, in combination, two members mounted for relative movement toward and away from each other by variations in pressure of fluid passing therebetween, one of said members having a shape suitable to produce the Magnus effect, means for operating said last mentioned member and causing the same to produce the Magnus effect, and means for directing a stream of fluid across said members.

5. In combination, a conduit mounted for lateral movement, a member positioned in the conduit and having a shape suitable for the production of the Magnus effect, said member being mounted for rotation about a stationary axis, means for rotating said member, and means for causing a stream of fluid to flow through said conduit.

6. The combination set forth in claim 5 in which means is provided for normally urging said conduit toward a predetermined position and to yieldingly oppose movement of said conduit away from such position.

7. The combination set forth in claim 5 in which valve means is provided for controlling the flow of fluid through said conduit and connections are provided between said conduit and valve means whereby to transmit movements of the conduit to the valve to effect changes of position in the valve.

8. The combination set forth in claim 5 in which a device for controlling the flow of fluid through said conduit is provided, spaced from the said member, and mechanism is provided to connect said device and member to effect automatic regulation of the flow of fluid through said conduit.

9. The method of operating a controlling or indicating device which comprises rotating a member shaped to produce the Magnus effect in a flowing fluid stream and effecting the operation of a controlling or indicating device by variations in pressure of the fluid adjacent said member.

WILBER A. CARTER.